United States Patent [19]

Dolejsi et al.

[11] 4,420,234

[45] Dec. 13, 1983

[54] COMBINATION TEXT AND PICTURE DISPLAY SYSTEM

[76] Inventors: Edward Dolejsi, 297 54th St., Delta, B.C., Calif.X, V4M 3G6; Robert G. Archer, 555 Newdale Rd., West Vancouver, B.C., Canada, V7T 1W7

[21] Appl. No.: 357,668

[22] Filed: Mar. 12, 1982

[51] Int. Cl.³ .............................................. G03B 21/00
[52] U.S. Cl. ..................................... 353/122; 353/36; 353/25; 40/463
[58] Field of Search ............... 340/705, 716, 721, 752, 340/756; 353/36, 94, 30, 25, 122; 434/428, 324, 314, 315; 40/447, 463; 364/518

[56] References Cited

U.S. PATENT DOCUMENTS

| | | | |
|---|---|---|---|
| 3,566,388 | 2/1971 | Andrews et al. | 340/768 |
| 3,651,511 | 3/1972 | Andrews et al. | 340/768 X |
| 3,816,791 | 6/1974 | Fluegel | 340/716 |
| 3,824,723 | 7/1974 | Gargas | 40/463 X |

Primary Examiner—Charles E. Frankfort
Assistant Examiner—W. Morris Worth
Attorney, Agent, or Firm—Berman, Aisenberg & Platt

[57] ABSTRACT

An integrated electronic dynamic alpha/numeric message and picture display system for simultaneously displaying photographic or poster-type pictures with alpha/numeric message texts. The programmed coded electrical information generating the text is also mixed with coded information to simultaneously control the visibility and presentation time of selected pictures from a series or array of accompanying pictures. In this manner it is possible to selectively generate text of any practical length while at the same time presenting to the viewer accompanying related pictures.

9 Claims, 3 Drawing Figures

COMBINATION TEXT AND PICTURE DISPLAY SYSTEM

BACKGROUND OF THE INVENTION

This invention relates to an integrated electronic dynamic alpha/numeric message and picture display system, and more particularly relates to a system which selectively generates text of any practical length while at the same time presenting to the viewer selected pictures.

Electrical signs or message centers displaying a travelling pattern of alpha numeric and/or graphic characters have been employed heretofore. These operate through the temporary energization of a selected pattern of light emitting devices such as incandescent or gas discharge lamps, or light emitting or reflecting semiconductors. The discreet light sources of such devices are typically arranged in a matrix or alternatively as a segmented pattern, allowing the forming of illuminated characters and graphical designs when an appropriate selection of individual light emitting devices is simultaneously energized. By causing the illuminated pattern of characters to sequentially and temporarily take up new positions progressively across the display matrix or field, a dynamic picture or continuously moving text of alpha/numeric characters is presented to the viewer. Examples of such devices are found in Andrews et al. U.S. Pat. Nos. 3,651,511 issued Mar. 21, 1972; 3,566,388 issued Feb. 23, 1971; and 3,493,956 issued Feb. 3, 1970.

The appropriate electrical signal information of instructions governing the selection and timing of the energizing cycle for each light emitting source in the above-mentioned types of display may be programmed into conventional magnetic or semi-conductor memories through the employment of electrical keyboard type encoding devices generating one of the standard binary codes such as ASCII and/or EBDIC.

To initiate such a visual display, the binary coded electrical programming signals are drawn or processed in their original sequential order from the memory by a semi-conductor signal processing device which in turn translates the coded signals into properly timed and distributed electrical control signals. These control signals activate a series of electrical driver units which switch on power to temporarily energize the desired selection of discreet light source devices, e.g. lamp, or diode, etc., thereby producing the specific illuminated character as originally entered into the keyboard.

Such a dynamic type message display can be programmed to present a continuously changing text to the viewer.

It is an object of the present invention to supplement information conveyed through such a text with a simultaneously displayed photographic or poster-type picture. Such a picture would usually be in enlarged form for larger audience viewing. A principle object of this invention is thus to provide an integrated text/picture display which will include a dynamic alpha/numeric message display of the general nature described above.

SUMMARY OF THE INVENTION

According to the present invention, the programmed coded electrical information generating the text is also mixed with coded information to simultaneously control the visibility and presentation time of selected pictures from a series or array of accompanying pictures. In this manner it is possible to selectively generate text of any practical length while at the same time presenting to the viewer accompanying related pictures. These two forms of visual communication will thus reinforce each other while at the same time utilizing the available physical space in an efficient and appealing manner.

More particularly, according to the present invention, an integrated electronic dynamic alpha/numeric message and picture display system is provided. The system is made up of a matrix or segmented pattern of discreet light source devices which allows the forming of illuminated characters when an appropriate selection of individual light source devices is simultaneously energized. A memory means is provided to store and provide appropriate electrical signal instructions governing the selection and timing of the energizing cycle for each light source device. An encoding device is also provided which is associated with the memory means for programming of the memory means. The system also comprises a signal processing means electronically associated with the memory means and the light source devices. The signal processing means processes signals from the memory means and translates those signals into properly timed and distributed electrical control signals for the light source devices. A series of electrical switching circuits are electronically associated with the signal processing means and with the light source devices, which circuits receive electrical control signals from the signal processing means and switch on power to temporarily energize the desired selection of light source devices and thereby produce the corresponding specific illuminated characters as originally entered to the encoding device. The system also comprises a picture retaining means for holding to be displayed a series of individual pictures. Picture illumination means are provided for individually illuminating pictures in the picture retaining means. Electronic control means are electrically associated with the picture illumination means to enable selective illumination of one or more pictures in the picture retaining means. Logic circuit means are electronically associated with the electronic control means and the signal processing means in order to receive electronic signals from the signal processing means designated for the picture illumination means and produce a desired response of the electronic control means.

The encoding device, memory means and signal processing means encode, store and process concurrent signals for the logic circuit means to control and operate the picture illumination means.

As will be described in more detail hereinafter, the picture retaining means may comprise a means to hold an array of poster-like pictures, or, in conjunction with the picture illuminating means, may comprise a remote controlled picture projector.

The invention makes possible two forms of multiple or series-type picture displays, combined with changing text, namely:

1. Array of front or back-lit photographs or picture poster panels

In this application the control signals mixed with the electrical information generating the text will determine which picture in a series of pictures is to be illuminated in accordance with its relationship to the message or descriptive text being displayed. When the message pertaining to the illuminated picture is complete the programmed memory will release signals which will switch off the illumination for that picture and switch on the illumination for another picture in the display series when required. The text will be displayed for the newly lit picture for one or more times as dictated by the programmer and then another picture will be illuminated during a new text presentation and so on.

2. Photograph transparency slide or film strip projector

A projector with multiple-slide cassette or film strip is controlled by appropriate signals from the memory to automatically select and project pictures to which the display text is intended to support or supplement. The text may be displayed wherever desired in relationship to its related picture which picture in turn will be projected on the front or on the rear of a screen as best suited for the physical viewing environment. When the text for a picture has run its course, the next passage of text from the memory will be preceded by another recorded control signal which will cause the projector to move the film strip or slide cassette to the corresponding picture to be projected.

BRIEF DESCRIPTION OF THE DRAWINGS

Other objects and advantages of the present invention will become apparent upon reading the following detailed description of example embodiments thereof, and upon referring to the drawings in which.

Figure 1:
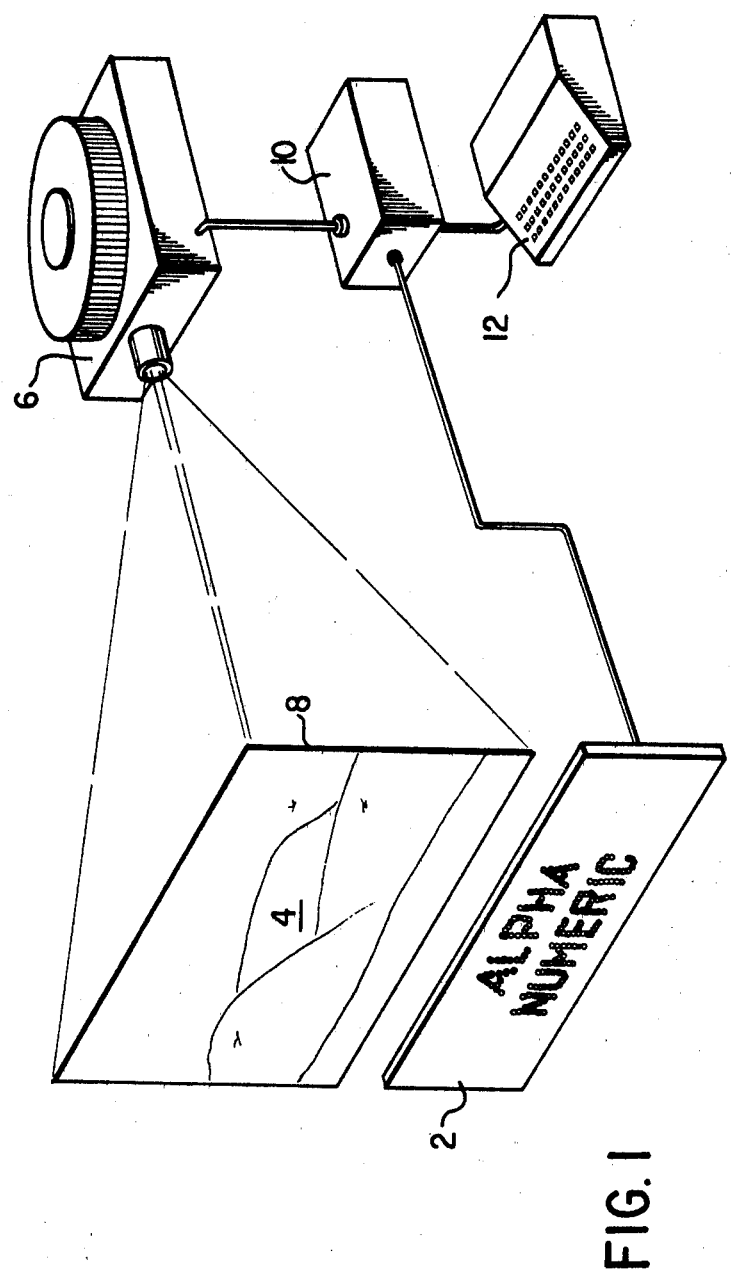
FIG. 1 is a schematic view of an integrated alpha/numeric slide or film strip projector system according to the present invention.

While the invention will be described in connection with example embodiments, it will be understood that it is not intended to limit the invention to such embodiments. On the contrary, it is intended to cover all alternatives, modifications and equivalents as may be included within the spirit and scope of the invention as defined by the appended claims.

DETAILED DESCRIPTION OF THE INVENTION

In the following description, similar features have been given similar reference numerals.

Turning to FIG. 1, there is shown a schematic view of an integrated electronic dynamic alpha/numeric message and picture display system according to the present invention. Above or below a standard dynamic alpha/numeric text display 2 a picture 4 from a picture illumination means 6 (here shown to be a slide projector) is displayed on a screen 8. Appropriate electrical signal information or instructions governing the selection and timing of the energizing cycle for each light emitting source of text display 2 is programmed into a processing unit 10 using a conventional electrical keyboard-type encoding device 12 which can generate one of the standard binary codes such as ASCII and/or EBDIC. Processing unit 10 is electronically associated with keyboard 12 as well as picture illumination means 6 and alpha/numeric text display device 2. As will be explained in more detail subsequently, keyboard encoding device 12 also enables the programming into processing unit 10 of coded electrical signal information or instructions governing the visibility and presentation time of selected pictures 4 from a slide or film strip projector 6, this information being co-ordinated with that for controlling text display 2. In this manner, text of any practical length is selectively generated while at the same time accompanying related pictures are presented to the viewer.

Figure 2:
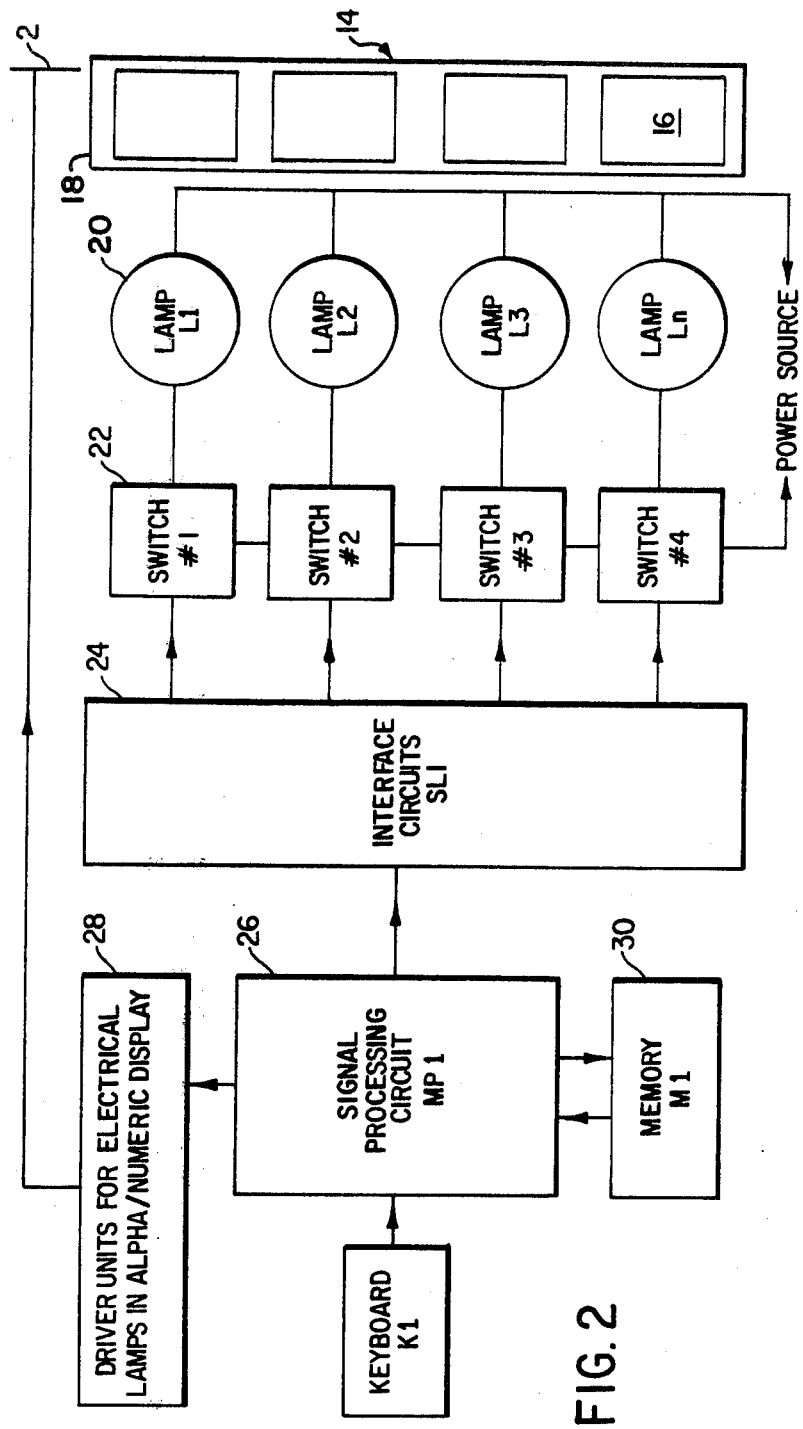
FIGS. 2 and 3 are respectively block diagrams illustrating the elements of an integrated alpha/numeric display-picture array system, and an alpha/numeric display-picture projector system according to the present invention.

Turning to FIG. 2, there is shown schematically a block diagram of a system according to the present invention in which an array 14 of back or front lit pictures or posters 16 are held in an appropriate retainer 18 to be illuminated in accordance with their relationship to the message or descriptive text being displayed on alpha/numeric text display 2. The appropriate picture 16 is illuminated through independently actuable illumination or light source devices 20, in the illustrated embodiment being a series of lamps each of which casts light, when actuated, upon its corresponding picture 16. Pictures or posters 16 which comprise array 14 are individually illuminated by the corresponding separate light source device 20 which projects light onto the front or back surface of the appropriate picture 16. These light sources can be commercially available electrical lamps, e.g. incandescent, florescent or gas discharged types, etcetera. The electrical power to selectively energize these light sources is supplied through suitable switching devices 22, such as electrical relays or semi-conductors.

The activation of each switching device 22 in the order and at the time required to power the appropriate light source device 20 is controlled through relay or semi-conductor interface logic circuits 24. These logic circuits in turn respond to one or more trigger pulses originating from signal processing devices 26. Signal processing device 26 concurrently generates the control signals which activate the driver units 28 for the light source devices in the alpha/numeric display device 2.

In its simplest mode of operation, logic circuit 24, upon receiving one or more trigger pulses from signal processing device 26 will, through the lamp switching devices 22, cause one or more of the presently energized picture light source devices 20 to be switched off while immediately switching on another light source device 20. A more complex execution of light source switching is also possible through the appropriate generation of signal pulses, e.g. leaving selected light source devices 20 on or off and adding a new selection of light source devices 20 which would then also be energized. The power level for each light source device may also be varied through the use of proper combination of components.

The mixing in of the coded signal pulses for control of the picture and text displays is accomplished through keyboard encoding device 12. To accomplish this either during, before or after the programmed recording of a passage of text, a specially selected key or set of keys is struck one or more times to generate and transmit binary coded signals into memory device 30, which memory device also is programmed through keyboard encoding device 12 to provide appropriate electrical signal information to govern the selection and timing of the energizing cycle for each light source device of the alpha/numeric display device. When the signal processing device 26 is activated to draw encoded text information from the memory, it will also encounter or read these encoded signals designed for the control of the illumination system of the picture display. Signal processing device 26 will respond by generating one or more trigger pulses through a connection to the logic circuits 24 of the picture illumination system. The logic circuits then react accordingly, to switch off and on through the relays or semi-conductor switching devices 22, the different light source devices 20 in the picture illuminating system.

The simplest example of command and execution for the picture illuminating system would proceed as follows. The programmer would program a passage of text into memory 30 using keyboard encoding device 12. The programmer would then strike a special key, for example twice. The resulting encoded signal captured in the memory 30 ultimately would result in two trigger pulses being received by the logic circuits 24 which would react by switching off a previously energized light source device 20 (e.g. #1, for the upper picture 16) and switching on light source devices 20 (#2) for another picture. After programming the second passage of text into the memory, the programmer would then strike the special key, for example three times. This would lead to the generation of three trigger pulses after the display of the second passage of text which would then result in switching off of the light source device 20 (#2) for the second picture, and switching on of light source devices 20 (#3) for the third picture.

Figure 3:
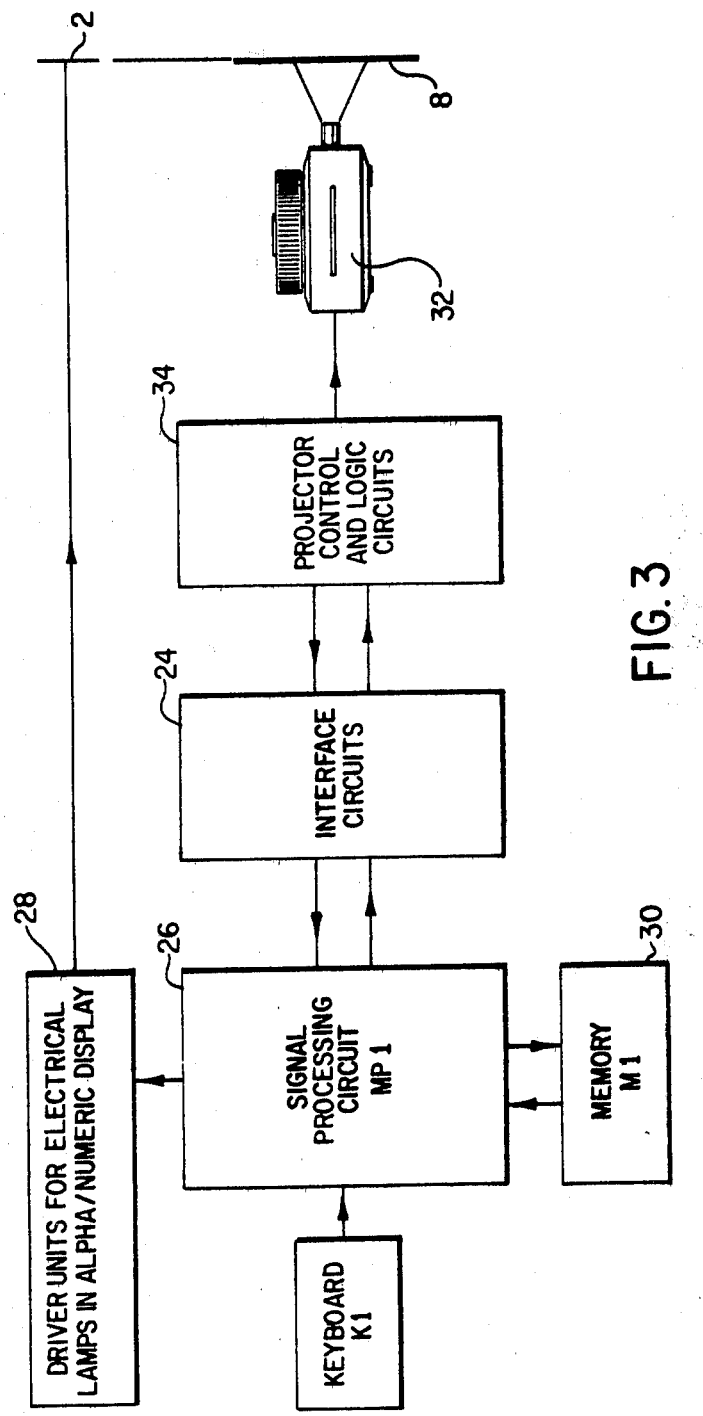

Turning to FIG. 3, a more detailed schematic drawing of the system of FIG. 1 is illustrated. In this example embodiment, picture 4 is created using projector 32 as the picture illuminating means. While the projector illustrated is a slide projector, alternatively a commercially available film strip projector may be used. The projector is used in the remote operation mode in order to combine and synchronize the projection of selected pictures along with the display of text on text display 2, so that an integrated operating system comprising picture and text is achieved. The operating parameters of projector 32 to be controlled in the application of this integrated system includes some or all of the following:

(1) Switching of projection lamp "on" or "off."
(2) Retrieving slides from the projector cassette tray 34 and positioning them for projection. This is done in a consecutive fashion corresponding to the physical ordering of the slides in the cassette tray.
(3) When a film strip projector is used, advancing the film strip to the next picture frame.
(4) Retrieving and projecting slides in the reverse order to that implied in (2) above.
(5) Random order selection by slide number, and projection of same slide through required operation of cassette tray 34 and projector 32.
(6) Random order selection and projection of any picture frame in the film strip.
(7) Switching-in of a replacement projection lamp.
(8) Dissolving or fading a picture from one projector to be replaced concurrently with a picture from a second projector.

Each of the above operating functions or modes can be initiated through a particular set of electrical signals specified by the projector manufacturer.

According to the present invention, keyboard encoding device 12 which generates character instructions for the text which are recorded in memory device 30 can be employed to also generate binary coded projector operation signals. These latter signals will be recorded in the same memory 30 and will in turn be decoded by the signal processor 26 in order to produce corresponding control signal pulses necessary to operate the projector according to the intent of the programmer. Thus in actual programming of the combined text and picture projection system, the programmer may at will introduce control instructions along with the composition of alpha/numeric text through appropriate use of keyboard encoding device 12.

By depressing specially designated keys, again the programmer can generate the binary coded signals corresponding to the chosen selection of picture and/or projector operation. These signals will subsequently be drawn from the display memory 30 and decoded by the signal processor 26 in order to generate the necessary control signals, passed through interface circuits 24 and projector control and logic circuits 34, to operate the projector in the desired phase relation with the running display of text.

Thus there has been provided in accordance with the invention an integrated electronic dynamic alpha/numeric message and picture display system that fully satisfies the objects, aims and advantages set forth above. While the invention has been described in conjunction with specific embodiments thereof, it is evident that many alternatives, modifications and variations will be apparent to those skilled in the art in light of the foregoing description. Accordingly, it is intended to embrace all such alternatives, modifications and variations as fall within the spirit and broad scope of the appended claims.

What I claim as my invention:

1. An integrated electronic dynamic alpha/numeric message and picture display system comprising:
    (a) a matrix or segmented pattern of discreet light source devices which allow the forming of illuminated characters when an appropriate selection of said discreet light source devices are simultaneously energized;
    (b) a picture retaining means for holding a series of individual pictures to be selectively displayed, picture illumination means for individually illuminating pictures in the picture retaining means, and electronic control means electrically associated with the picture illumination means to enable selective illumination of one or more pictures in the picture retaining means;
    (c) a memory means to store and provide appropriate electrical signal instructions governing the selection and timing of the energizing of each said light source device, and governing the said selective illumination of one or more pictures;
    (d) an encoding device associated with the memory means for coding and combining the said signal instructions into a single signal so as to inherently synchronize selected alpha/numeric passages with selected picture illumination;
    (e) signal processing means to process signals from the memory means to translate the said signals into control signals for the light source devices and the electronic control means for picture selection and illumination;
    (f) a series of electrical switching circuits electronically associated with the signal processing means and with the light source devices to receive electrical control signals from the signal processing means and switch on power to temporarily energize the desired selection of light source devices, thereby producing the corresponding specific illuminated character as originally entered to the encoding device; and
    (g) logic circuit means electronically associated with the electronic control means and the signal processing means to receive electronic signals from the signal processing means designated for the picture illumination means and produce a desired response of the electronic control means.

2. A system according to claim 1, wherein the picture retaining means comprises a means to hold an array of poster-like pictures.

3. A system according to claim 2 wherein illumination devices are provided to selectively illuminate each picture to be displayed in the array, and switch means are provided for each illumination device, the switch means being electrically associated with the logic circuit means so that the illumination devices are switched off or on in accordance with signals designated for the picture illumination means received from the signal processing means.

4. A system according to claim 3 wherein the switch means is selected from the group comprising relays and semi-conductor switching devices.

5. A system according to claim 1, wherein the picture retaining means and picture illumination means comprise a remote controlled picture projector with a projection lamp, and a display screen.

6. A system according to claim 5 wherein the said remote control projector includes selectively operable means for activating and deactiviating said projector; for selecting pictures and projecting them in a consecutive fashion corresponding to the physical order or the reverse order of the pictures in the projector; for advancing to the next picture in sequence of pictures in the projector; for selecting and projecting pictures in random fashion from among the pictures in the projector; for activating a replacement projection lamp; and for dissolving or fading a picture from the said projector to be replaced by a picture from a second projector; and wherein the said electronic control means is electrically associated with the said projector and the logic circuit means is arranged to receive signals from the signal processing means to selectively operate said selectively operable means.

7. A system according to claim 1 wherein the light source devices are selected from the group consisting of lamps and light emitting diodes.

8. A system according to claim 1 wherein the alpha/-numeric message and the picture are adapted to be diaplayed on separate media.

9. A system according to claim 8 wherein the picture display medium is a projection screen.

* * * * *